United States Patent
Lowry et al.

(10) Patent No.: US 11,490,129 B2
(45) Date of Patent: Nov. 1, 2022

(54) CREATING MULTI-CAMERA PANORAMIC PROJECTIONS

(71) Applicant: C360 Technologies, Inc., Wexford, PA (US)

(72) Inventors: Brian C. Lowry, Emlenton, PA (US); Joseph B. Tomko, Wexford, PA (US); Evan A. Wimer, Pittsburgh, PA (US)

(73) Assignee: C360 Technologies, Inc., Wexford, PA (US)

( * ) Notice: Subject to any disclaimer, the term of this patent is extended or adjusted under 35 U.S.C. 154(b) by 0 days.

(21) Appl. No.: 16/755,042

(22) PCT Filed: Oct. 12, 2018

(86) PCT No.: PCT/US2018/055642
§ 371 (c)(1),
(2) Date: Apr. 9, 2020

(87) PCT Pub. No.: WO2019/075349
PCT Pub. Date: Apr. 18, 2019

(65) Prior Publication Data
US 2021/0144413 A1     May 13, 2021

Related U.S. Application Data

(60) Provisional application No. 62/571,876, filed on Oct. 13, 2017.

(51) Int. Cl.
*H04N 21/218* (2011.01)
*H04N 21/81* (2011.01)
(Continued)

(52) U.S. Cl.
CPC ... *H04N 21/21805* (2013.01); *H04N 21/4316* (2013.01); *H04N 21/472* (2013.01); *H04N 21/816* (2013.01)

(58) Field of Classification Search
CPC ......... H04N 21/21805; H04N 21/2187; H04N 21/23418; H04N 21/26603;
(Continued)

(56) References Cited

U.S. PATENT DOCUMENTS 7,277,118 B2    10/2007  Foote
8,970,666 B2 *   3/2015  DiGiovanni ....... H04N 21/2187
                                                        700/91
(Continued)

FOREIGN PATENT DOCUMENTS

WO    2016040833 A1    3/2016
WO    2017161287 A1    9/2017

OTHER PUBLICATIONS

International Search Report for PCT Application No. PCT/US2018/055642, dated Jan. 2, 2019, 2 pages.
(Continued)

*Primary Examiner* — Rong Le
(74) *Attorney, Agent, or Firm* — Ference & Associates LLC

(57) ABSTRACT

One embodiment provides a method, including: obtaining, from each of two more panoramic cameras, panoramic video, wherein each of the two or more panoramic cameras are located at different physical locations within an event environment; compositing the panoramic video obtained from the two or more panoramic cameras into a single video; and streaming the composited panoramic video to one or more end users, wherein each of the one or more end users provide commands to manipulate the streamed composited panoramic video resulting in viewing of a different view of the streamed composited panoramic video for the corresponding end user based on the provided commands.

20 Claims, 4 Drawing Sheets

(51) Int. Cl.
*H04N 21/472* (2011.01)
*H04N 21/431* (2011.01)

(58) Field of Classification Search
CPC ......... H04N 21/2665; H04N 21/41407; H04N 21/44008; H04N 21/4622; H04N 21/4788; H04N 21/485; H04N 21/4858; H04N 21/8126; H04N 21/8133; H04N 21/8193; H04N 21/8352
See application file for complete search history.

(56) References Cited

U.S. PATENT DOCUMENTS

| | | |
|---|---|---|
| 9,654,844 B2 | 5/2017 | Kim et al. |
| 2013/0271564 A1 | 10/2013 | Zaffagnini |
| 2014/0098185 A1 | 4/2014 | Davari et al. |
| 2014/0270684 A1* | 9/2014 | Jayaram ................. H04N 7/181 386/224 |
| 2016/0080830 A1* | 3/2016 | Kim ................... H04N 21/8193 725/19 |
| 2016/0253795 A1* | 9/2016 | Cole ......................... G06T 7/80 345/426 |
| 2016/0295108 A1 | 10/2016 | Cao |
| 2018/0316856 A1* | 11/2018 | Kimber ................... G06F 3/147 |
| 2019/0260929 A1* | 8/2019 | Kaneko .................... H04N 5/04 |
| 2020/0336719 A1* | 10/2020 | Morisawa ............. G06T 15/205 |

OTHER PUBLICATIONS

Stephane, Nicolau, Supplementary European Search Report for EP Patent Application Serial No. EP18866185, May 14, 2021, 2 pages, Munich, Germany.

* cited by examiner

CREATING MULTI-CAMERA PANORAMIC PROJECTIONS

CLAIM FOR PRIORITY

This application claims priority to U.S. Provisional Patent Application Ser. No. 62/571,876, filed on Oct. 13, 2017, entitled "CREATING MULTI-CAMERA PANORAMIC PROJECTIONS", the contents of which are incorporated by reference herein.

BACKGROUND

Panoramic video is becoming increasingly popular, particularly on social media web sites such as Facebook, YouTube, and Twitter. Unlike conventional, or "flat" (planar) video, panoramic video permits the user to pan, tilt, and zoom in the immersive environment, thus creating a personalized experience. Many camera systems exist today that are able to capture and store panoramic video for publication on social media web sites. More sophisticated systems likewise exist and allow live events to be "streamed" to the social media sites for viewing in real time (a.k.a "live").

BRIEF SUMMARY

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
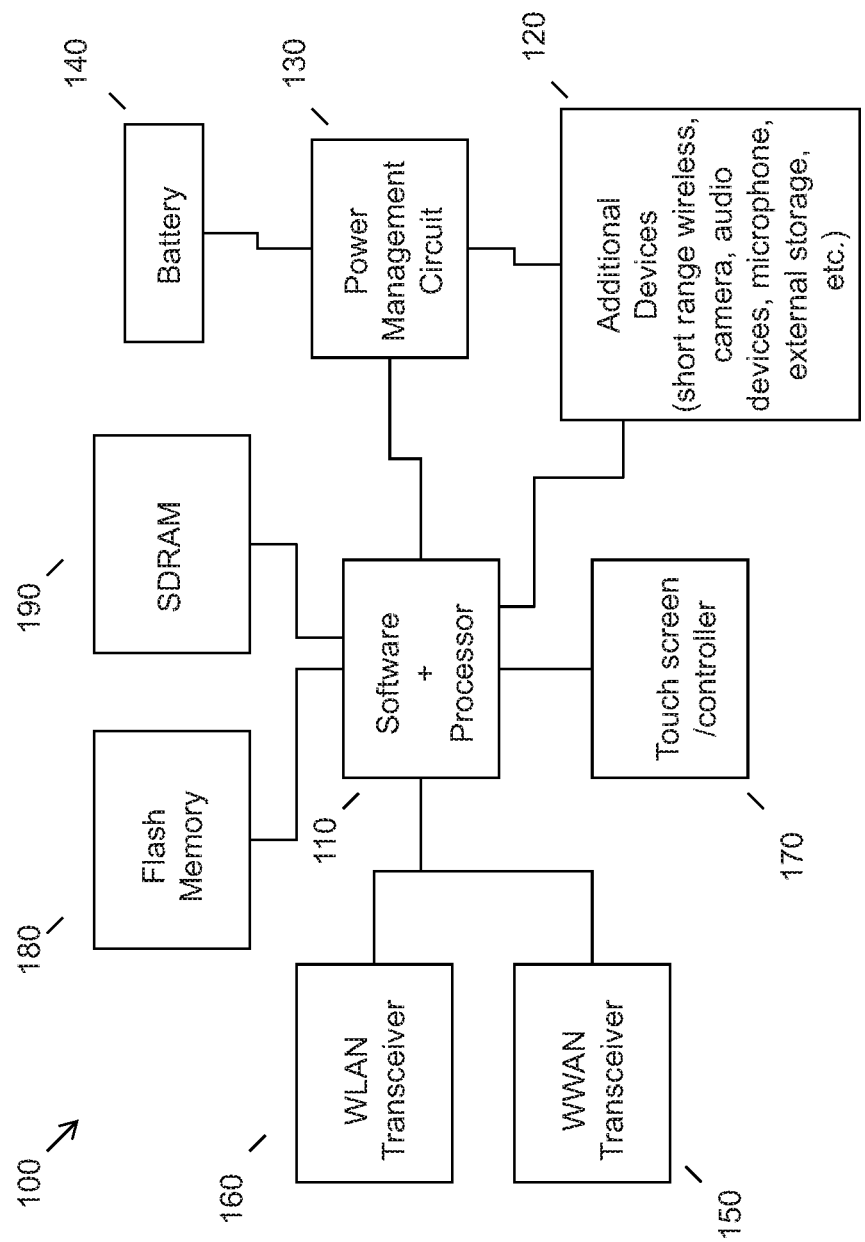
FIG. 1 illustrates an example information handling device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Panoramic cameras can be characterized by the horizontal and vertical fields of view (HFOV & VFOV) that they capture. For example, some cameras may capture a 90° VFOV together with a 360° HFOV, resulting in a cylindrical projection. This may be accomplished by using two or more cameras coupled with an on-board processor capable of stitching the images into a single projection. Other systems may employ four or more cameras to capture a full sphere—minus the nadir (which is the point of the sphere described by the panoramic cylinder that is directly opposite the zenith and vertically downward the observer). These cameras likewise use stitching software to produce a spherical or equirectangular projection. The equirectangular projection maps meridians to vertical straight lines of constant spacing, and circles of latitude to horizontal straight lines of constant spacing. It should be noted that in all of these scenarios, the plurality of cameras that are composited to form the aggregate, projection are in physical proximity to one another, typically being mounted on a rig, or integrated into a single mechanical housing. The objective of these systems is to provide a panoramic view from a single point in space—a first person perspective.

While the first person perspective is very useful, there are instances when it is suboptimal. For example, in many sports events, there are two high-value points of view. In hockey and soccer, ample, these points of view are within each of the nets, for example, as a third person observer to the goalie. In basketball, the favored points of view are the opposing baskets. From a remote fan or spectator's perspective, it would be ideal to have a simultaneous view from both high-value points of view. With this ability, the remote spectator can then quickly and seamlessly transition between the two points of view as the game play transitions from net to net. In baseball, it may be desirable to have a point of view from behind the catcher, and from both first and third base, or alternatively, from both dugouts. For concert-goers it may desirable to have a first-person view from the stage.

Thus an embodiment provides a method, comprising: capturing, using at least two or more panoramic cameras, video from desirable vantage points. These vantage points may provide diametric views of a sporting event, such as views from within opposing nets in a soccer match, or they may be geospatially separated, such as one view coming from within the net and the second view coming from outside the locker room. Embodiments provided that in order for an event to be live streamed, the aggregate latency from a real event to the time the real event is viewed remotely should be in the order of seconds (typically <30 seconds).

In another embodiment the cameras are networked to a workstation via fiber optic transmission cables, providing long distance communications ($\leq 10$ km), at low latency (10 Gbs).

The workstation may contain one or more frame grabbers which ingest the video frames from two or more cameras simultaneously and transfers them to a graphics processing unit (CPU).

Various video pipeline operations are performed on a CPU. These operations may include: debayering (demosaicing), noise reduction, color correction, etc. Following this stage, the video images are mathematically transformed to yield a desired shaped projection, such as equirectangular. This procedure is performed on a frame-by-frame basis, typically at the rate of thirty to sixty frames per second.

Once the video images have been transformed into the desired shaped projections for each camera, the projections may be composited into one final composited projection. In the case of cameras which capture a 180°0 HFOV, the video frames are composited "back-to-back". In the case of full 360-degree video frames, only half of each video frame can be used to make the final composited projection. In such a case, the portion of the video frame that is to be included in the final composited projection may be determined by an a priori rule, such as the orientation of the camera, or may be done dynamically, via a human operator who may determine the most valuable part of the scene.

The combined, final composited projection may then be encoded with an industry standard codec. Non-limiting examples of such a codec are H.264 or HEVC.

Finally, the encoded video frames are streamed via the workstation network interface card. Typically, they are streamed to an Over-The-Top (OTT) cloud-based platform for further transcoding and distribution.

End users, viewing the stream on mobile devices, via web browsers on personal computers, or on virtual reality (VR) devices, may then interact with the stream by changing their gaze directions (up, down, left, right) as well as zooming in and out in the panoramic environment. For example, the initial view may be from within Red Team's net, while the second view is from within Blue Team's net. By swiping their finger from left to right, or vice versa, the user transitions between the two net views, as if it were a single panoramic environment. Alternatively, the user may elect to "auto track" a device. In this scenario, positional data for objects of interest (e.g., a player) are packaged and transmitted with the stream, allowing the user to select that object of interest, then have the viewing application automatically adjust the gaze direction per the location of the object of interest in the panorama as taught in U.S. Patent Pub. No. 2016/0173775.

The description now turns to the figures. The illustrated embodiments of the invention will be best understood by reference to the figures. The following description is intended only by way of example and simply illustrates certain example embodiments.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be ted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Soft and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and 12C.

There are power management chip(s) 130, e.g., a battery management unit, MU, which manage power as supplied, for example, via a rechargeable battery 140 which may be recharged by a connection to a power source (not shown). In at least one design, a single chip, such as 110, is used to supply BIOS like functionality and DRAM memory.

System 100 typically includes one or more of MAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
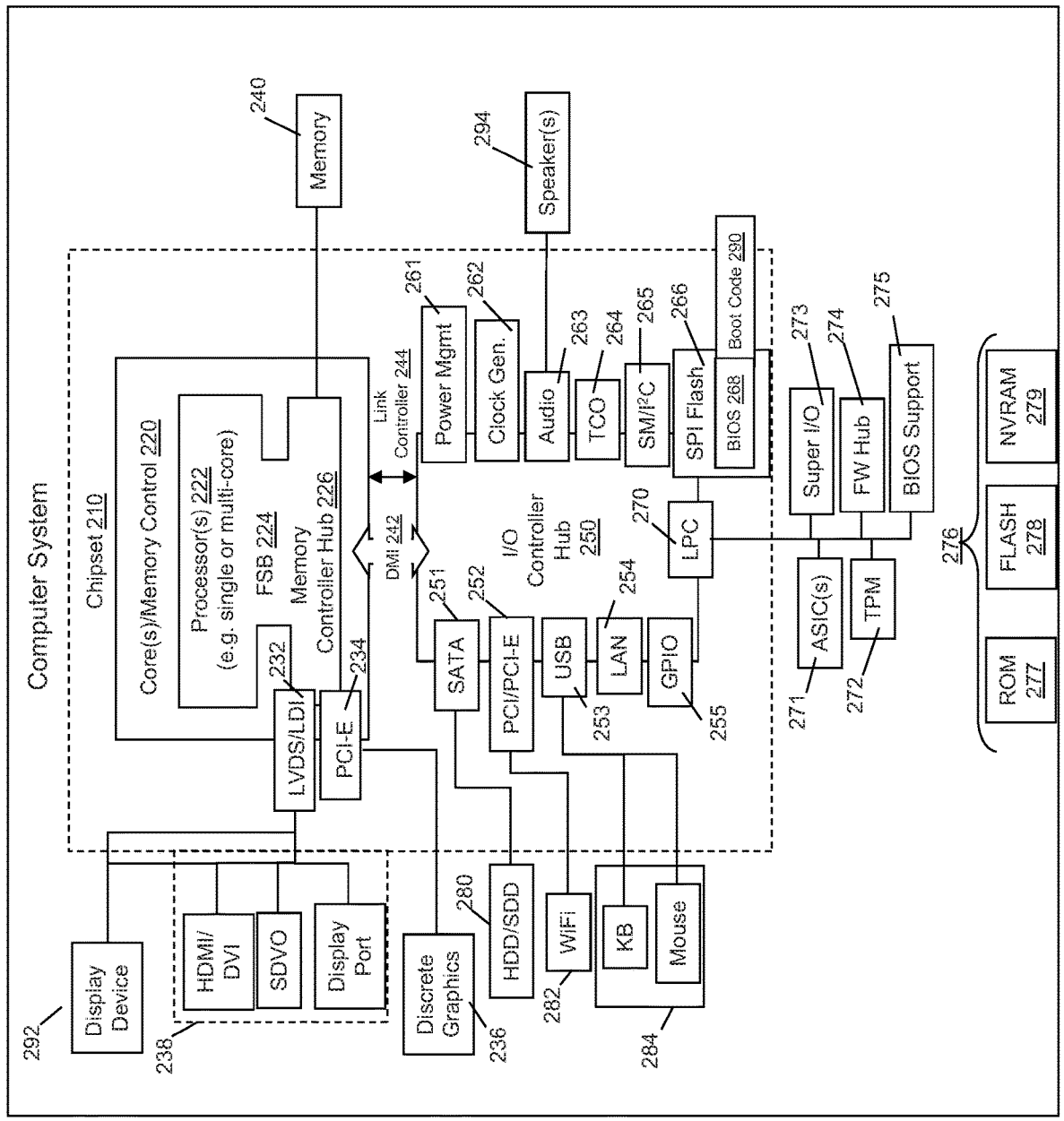
FIG. 2 illustrates an example information handling system.

FIG. 2 depicts a block diagram of another example of information handling device circuits, circuitry or components. The example depicted in FIG. 2 may correspond to computing systems such as the THINKPAD(R) series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United. States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which enable users to communicate with a digital assistant. For example, the circuitry outlined in FIG. 1 may be implemented in a tablet or smart phone embodiment, whereas the circuitry outlined in FIG. 2 may be implemented in a personal computer embodiment.

Figure 3:
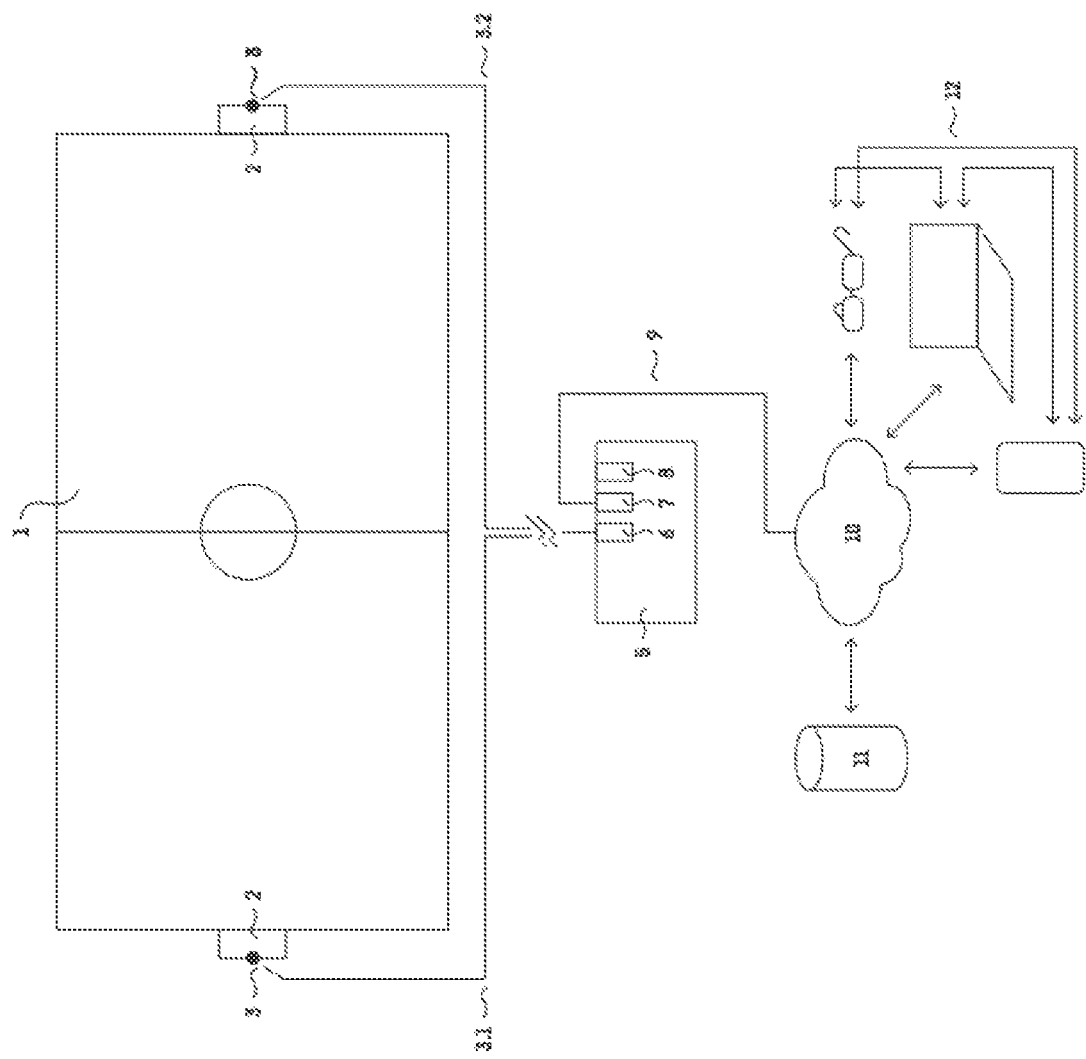
FIG. 3 illustrates an example embodiment.

Referring now to FIG. 3, a non-limiting example embodiment is provided in the context of a soccer field (1), Such an example embodiment may be implemented on any number and combination of information handling devices and systems, including the examples shown FIG. 1 and FIG. 2. It will be appreciated that embodiments may be provided in varied and unlimited contexts. Additional non-limiting examples include, but are not limited to, basketball games, football games, automobile racing, police and military context.

Returning to the example in FIG. 3, on the soccer field (1) are two opposing nets (2)—the Blue Team net on the left and the Red Team net on the right. In each of the nets (2) are located an outward-facing panoramic camera (3). In this embodiment, each camera (3) captures a HFOV and VFOV of 180°—a full hemisphere. In this example, the cameras are off-the-shelf JAI SP-200000-CXP2 with proprietary optics designed by ImmerVision, Inc.

Optionally, a short focal length "fisheye" lens would suffice, such as the Canon 8-15 mm f/4 USM L. The cameras may communicate with a remote workstation (5), typically located in production truck that may be 1-10 km from the location of the cameras. However, it should be noted that such a production truck may be located any practical distance from the cameras.

In the present embodiment, the remote workstation (5) is a custom-built unit from Next Computing, Inc. comprising an ASUS® X99-E Mainboard with an Intel® Xeon-E5 Processor having 16 GB DDR4-2133 MHz-non ECC RAM an 850 W Power Supply running Microsoft Windows 10-Pro 64 Bit operating system. The frame grabber is a Komodo Kaya FXP, manufactured by Kaya instruments. ASUS® is a registered trademark of Asustek Computer Incorporation of Taiwan. INTEL® is a registered trademark of Intel Corporation of Delaware.

The communication with the workstation (5) and the cameras (2) may be accomplished by utilizing one or more 10 Gbs fiber optic links (3.1, 3.2). The fiber links (3.1, 3.2) may be connected to a frame grabber card (6) located in the remote workstation (5). Other suitable links between the workstation (5) and the cameras (2) may be utilized as well.

Also located in the remote workstation (5) is the frame grabber (6), along with custom software, which allows for the direct transfer of video frames from the frame grabber memory to the graphics processing unit GPU (8). The GPU (8) is specifically designed to process video frames at high rates, whereas the workstation central processing unit (CPU) is designed for more general purpose tasks. Thus, the objective is to transfer video frames from the frame grabber (6) to the GPU (8) with as little CPU intervention as possible, as this would degrade performance.

The present embodiment describes having only two cameras connected to the workstation. This is a non-limiting example as the remote workstation (5) may contain multiple frame grabbers, each connected to multiple cameras. Further, while examples have described using one or more panoramic cameras, embodiments are equally applicable to conventional cameras whether taking still photographs or capturing moving video.

Also included in the remote workstation (5) is network interface card (7) which is in communication with network (10) via WAN, LAN, or Internet connection. The network (10) may be in communication with various information handling devices (12), which include, but are not limited to, smart phones, lap tops, PCs, tablets, and smartglasses, and VR (Virtual Reality) hardware.

Embodiments provide that network interface card (7) may be a PCI (Peripheral Connect Interconnect), or any derivatives, for example, PCIe (PCI-Express). Network (10) may be a cloud based network, WAN, or LAN or any other computer network. Embodiments provide that other suitable network interface cards may be used to communicate to network (10) as desired.

In this example, the video content (or "stream") produced may be communicated through network (10) to a Content Distribution Network (CDN)(11) such as an Over-the-Top (OTT) network distributor. The CDN may then communicate the video content through the network (10) to end users employing various information handling devices (12). Such information handling devices may employ web browsers or other software or hardware-based methods or a combination for receiving, displaying, and interacting with the video content from the network (10).

In another embodiment, one or more of the "live" cameras may be replaced or augmented by additional video content. For example, in a live sports production, the signal that is telecasted and viewed by users via television or cable may be ingested by the remote workstation (5) in a similar manner in which the camera feeds are ingested. In this case, each telecast video frame may be synchronized with the camera frames, and the software may be instructed to embed such content in the projection in any number of ways, such s a Picture-In-Picture, or the like.

Once video frames are pushed to the GPU (8) memory, they may be manipulated. Some typical operations are debayering (demosaicing), denoising, white balance adjustment, the application of 3D LUTs (Look-Up Tables) used for color correction, and the like. These video pipeline operations may improve the video quality. These video pipeline operations are performed in custom software optimized for GPU processing. The present example embodiment uses specifically the GEFORCE GTX® 1080 Ti, a registered trademark of the NVIDIA company, and employs software and libraries written in NVIDIA's proprietary processing language CUDA®, a registered trademark of NVIDIA company. This language harnesses the massively parallel processing architecture of the GPU.

The next operations on the GPU (8) consist of transformational operations. These transformational operations may create a composited projection that may be encoded and streamed. In a non-limiting example of a single camera system, the captured oval may be transformed into an equirectangular, or a portion of an equirectangular, projection. The specific lens used in the present embodiment is an anamorphic lens built by ImmerVision with the following non-limiting specifications: Wavelength 415-670 mm, FOV 182% MTF >30% @ 39 lp/mm on both long and short axis, f/number 4, Anamorphosis Ratio 5:4, Lens Material: glass, Minimum Focus 500 mm, Chief Ray Entrance on sensor <4°, Weight <700 grams, Operating Temperature—20-40° C., Diameter 105.20 mm, Focal Length: 8:11 mm. Thus, the lens images the scene as an ellipse or oval on the camera sensor (CMOS). If we, were to employ a standard "fisheye" lens, the image formed on the sensor would be circular. For the purposes of this disclosure, we will continue to refer to the "oval of information". For a hemispherical camera, the oval will map (transform) into one half of an equirectangular projection. The mathematical transform maps pixels in the source video frame (oval) to the equirectangular video frame. The algorithm to do this mapping is as follows:

For each pixel in the equirectangular frame:

1. Calculate the 3D Cartesian coordinates from the longitude and latitude associated with the pixel. These coordinates lie on a unit sphere with optical axis mapped to the z-axis.

2. Apply the distortion curve function that maps the angle with a radial distance from the optical axis on the sensor image (oval). For our anamorphic lens, this requires two distortion curve functions, one for the horizontal lens direction and one for vertical lens direction. The radial distortion is a weighted average of the two functions where the weights are proportional to the Cartesian distances to the optical axis.

3. Rotate, scale, and shift the x and y components of distorted position into the sensor's (oval) frame of reference and apply the color corrected sensor value to the pixel.

Embodiments may be applied to any composited projection type. Non-limiting examples of projection types include, but are not limited to, equirectangular and cubic. The same compositing feature that is described here is invariant with respect to the projection type, as the mapping is a trivial, low latency computation. For the purposes of this disclosure, we will continue to use the equirectangular projection.

Figure 4:
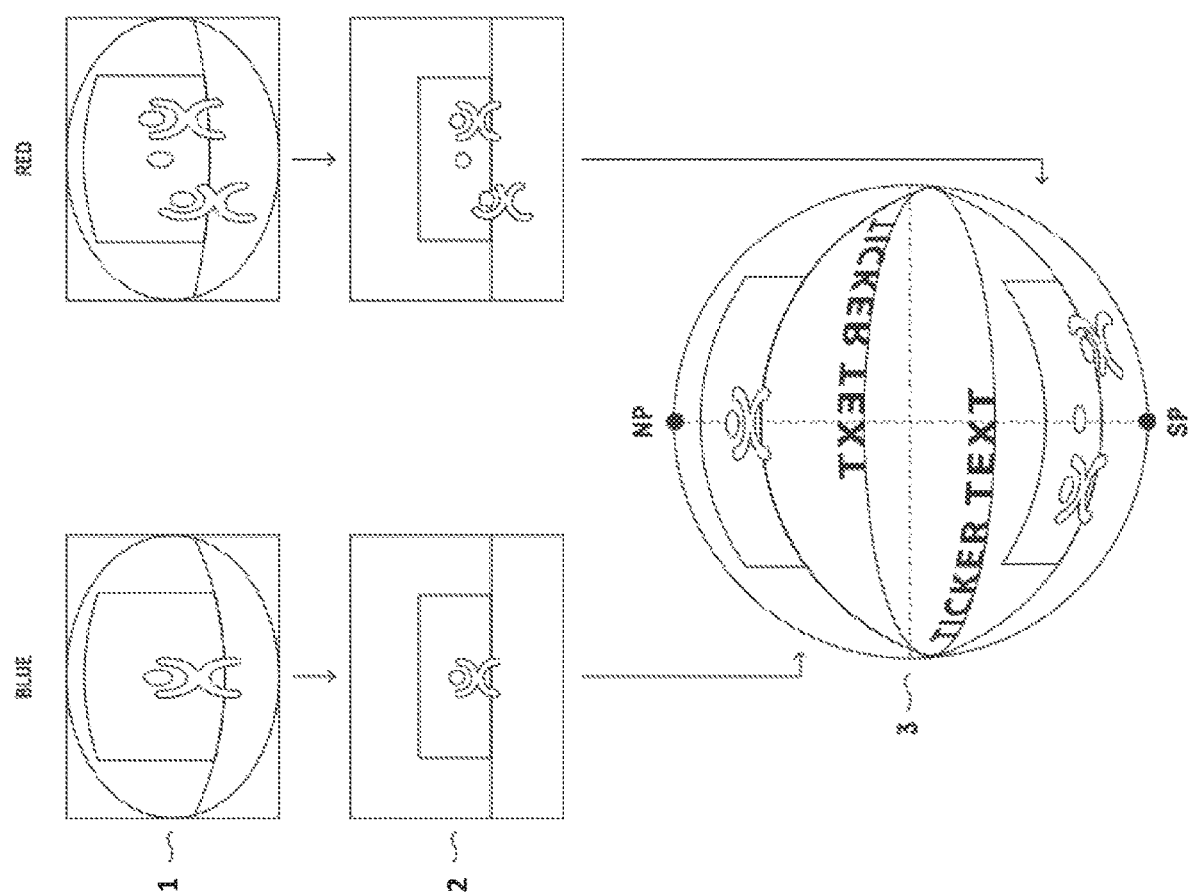
FIG. 4 illustrates an example embodiment.

Using the above algorithm, two cameras producing two hemispheres may be composited to form a single equirectangular projection such that views are diametrically opposed as shown in FIG. 4. At 1, the oval of information captured by each of two cameras s shown one for the Blue Team and one for the Red Team. At 2, a "flattened" of planar view n the oval, framing a particular object of interest—the net and goalie is shown, An example that demonstrates how two entire ovals can be mapped to a single sphere, which in turn is transformed to an equirectangular projection for transport and end-user consumption is seen at 3.

There are limitless ways for compositing videos in the manner described above. As a non-limiting example, we can capture video frames from five video cameras and create a composited equirectangular projection as follows: one half of the equirectangular projection may consist of a panoramic video capture (hemisphere), while the opposite half may consist of four quadrant views. These compositing operations may be "hard coded", or they may be operator-directed in real time. For example, a system may ingest four cameras, while operator chooses two at any given time to be composited.

Graphics may be drawn on the composited video as shown at 3 in FIG. 4. Graphics may consist of static and dynamic images, or three dimensional models. In one embodiment, meridional band may be drawn, separating the two hemispherical camera views. This graphics band can display, for example, the Blue and Red team scores, the game clock, logos, and other relevant information Additionally, the inserted graphics may be used for the purposes of advertising.

Upon building the composited projection, each video frame is encoded, Turning back to FIG. 3, for the present embodiment, we encode the video using the H.264 or HEVC codecs which are used for video transmission. Thereafter, the video frames are sent to the network interface card (7), being converted to an Internet Protocol (IP) stream containing the video content and packaged suitably for transport to the network (10), typically being connected via a cat 6 patch cable (9), fiber optic link, or wireless transmission.

The video content may be directed to a Content Distribution Network (CDN) (11) or Over-The-Top (OTT) partner. The OTT/CDN provides services such as buffering, additional transcoding, and ultimately distribution of the stream via a network of servers, allowing for scalable and reliable stream consumption. End users via information handling devices (12) ingest and view the video content.

In an embodiment, the user may use the popular FACEBOOK® application to view the stream on one page. Embodiments provide that, while viewing the stream, the user may pan, tilt, and zoom the view in an immersive environment. It should be understood that the user would not be controlling the camera capturing the stream. Rather, because the video stream is captured as a panoramic view, the user is able to manipulate the view within the stream. In other words, while the video stream is captured in panoramic, a user only sees a portion of the panoramic stream at a single time, referred to herein as a view. Therefore, the user is able to provide commands (e.g., tilt, pan, zoom, etc.) to see a different portion, or view, of the panoramic stream. Additionally, embodiments provide the information handling device user with the ability to view a composited equirectangular view consisting of multiple camera views on one screen thus eliminating the multiple pages conventionally used to show multiple points of view. Other social networks, television providers, news providers, or other entities that provide content over the Internet, that use multiple pages to stream multiple points of view likewise may employ the described embodiments to stream multiple points of view on one page.

While the various example embodiments have been described in connection with the examples provided herein, these were provided as non-limiting examples. Accordingly, embodiments may be used in similar contexts with similar devices and methods.

It will also be understood that the various embodiments may be implemented in one or more information handling devices configured appropriately to execute program instructions consistent with the functionality of the embodiments as described herein. In this regard, FIG. 1 and FIG. 2 illustrate a non-limiting examples of such devices and components thereof.

As will be appreciated by one skilled in the art, various aspects may be embodied as a system, method or device program product. Accordingly, aspects may take the form of an entirely hardware embodiment or an embodiment including software that may all generally be referred to herein "circuit," "module" or "system." Furthermore, aspects may take the form a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is a non-transitory storage medium, inclusive of all storage media other than signal or propagating media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
obtaining, from each of two or more panoramic cameras, panoramic video, wherein each of the two or more panoramic cameras are located at different physical locations within an event environment;
compositing the panoramic video obtained from the two or more panoramic cameras into a single video, wherein the compositing comprises generating a composited projection by selecting a portion of a frame of the panoramic video to composite based upon a field of view captured by the plurality of panoramic cameras and transforming the composited projection into an equirectangular video frame by mapping pixels of the panoramic video to the equirectangular video frame; and
streaming the composited panoramic video to a plurality of end users, wherein at least a subset of the plurality of end users provide commands to manipulate the streamed composited panoramic video resulting in viewing of a different view of the streamed composited panoramic video for the corresponding end user based on the provided commands, each of the subset who provided commands viewing a different view than and at the same time as other of the plurality of end users.

2. The method of claim 1, wherein the compositing comprises transforming the obtained panoramic video into a predetermined projection shape.

3. The method of claim 1, wherein the compositing comprises using half of a video frame obtained from each of the two or more panoramic cameras.

4. The method of claim 1, wherein the compositing comprises augmenting a telecast video frame with the panoramic video obtained from at least one of the two or more panoramic cameras.

5. The method of claim 1, comprising transforming the panoramic video from each of the two or more panoramic cameras to an equirectangular projection.

6. The method of claim 5, wherein the compositing comprises calculating three-dimensional coordinates for each pixel within the equirectangular projection.

7. The method of claim 6, wherein the compositing further comprises mapping, by applying a distortion curve function, an angle for each of the three-dimensional coordinates to a radial distance from an optical axis of a lens of the panoramic camera.

8. The method of claim 7, wherein the compositing further comprises rotating, scaling, and shifting the three-dimensional coordinates to a frame of reference for the lens based upon the mapping.

9. The method of claim 1, wherein the compositing comprises apply a color correction to pixels of the obtained video.

10. The method of claim 1, wherein the streaming comprises encoding the composited panoramic video.

11. A system comprising:
two or more panoramic cameras;
a processor; and
a memory device that stores instructions executable by the processor to:
obtain, from each of the two or more panoramic cameras, panoramic video, wherein each of the two or more panoramic cameras are located at different physical locations within an event environment;
composite the panoramic video obtained from the two or more panoramic cameras into a single video, wherein the compositing comprises generating a composited projection by selecting a portion of a frame of the panoramic video to composite based upon a field of view captured by the plurality of panoramic cameras and transforming the composited projection into an equirectangular video frame by mapping pixels of the panoramic video to the equirectangular video frame; and
stream the composited panoramic video to a plurality of end users, wherein at least a subset of the plurality of end users provide commands to manipulate the streamed composited panoramic video resulting in viewing of a different view of the streamed composited panoramic video for the corresponding end user based on the provided commands, each of the subset who provided commands viewing a different view than and at the same time as other of the plurality of end users.

12. The system of claim 11, wherein the compositing comprises transforming the obtained panoramic video into a predetermined projection shape.

13. The system of claim 11, wherein the compositing comprises using half of a video frame obtained from each of the two or more panoramic cameras.

14. The system of claim 11, wherein the compositing comprises augmenting a telecast video frame with the panoramic video obtained from at least one of the two or more panoramic cameras.

15. The system of claim 11, comprising transforming the panoramic video from each of the two or more panoramic cameras to an equirectangular projection.

16. The system of claim 15, wherein the compositing comprises calculating three-dimensional coordinates for each pixel within the equirectangular projection.

17. The system of claim 16, wherein the compositing further comprises mapping, by applying a distortion curve function, an angle for each of the three-dimensional coordinates to a radial distance from an optical axis of a lens of the panoramic camera.

18. The system of claim 17, wherein the compositing further comprises rotating, scaling, and shifting the three-dimensional coordinates to a frame of reference for the lens based upon the mapping.

19. The system of claim 11, wherein the compositing comprises apply a color correction to pixels of the obtained video.

20. A product, comprising:
a storage device that stores code, the code being executable by the processor and comprising:
code that obtains, from each of two or more panoramic cameras, panoramic video, wherein each of the two or more panoramic cameras are located at different physical locations within an event environment;
code that composites the panoramic video obtained from the two or more panoramic cameras into a single video, wherein the compositing comprises generating a composited projection by selecting a portion of a frame of the panoramic video to composite based upon a field of view captured by the plurality of panoramic cameras and transforming the composited projection into an equirectangular video frame by mapping pixels of the panoramic video to the equirectangular video frame; and
code that streams the composited panoramic video to a plurality of end users, wherein at least a subset of the plurality of end users provide commands to manipulate the streamed composited panoramic video resulting in viewing of a different view of the streamed composited panoramic video for the corresponding end user based on the provided commands, each of the subset who provided commands viewing a different view than and at the same time as other of the plurality of end users.

* * * * *